US008661031B2

(12) United States Patent  (10) Patent No.: US 8,661,031 B2
Chandra  (45) Date of Patent: Feb. 25, 2014

(54) METHOD AND APPARATUS FOR DETERMINING THE SIGNIFICANCE AND RELEVANCE OF A WEB PAGE, OR A PORTION THEREOF

(76) Inventor: Rohit Chandra, Sunnyvale, CA (US)

( * ) Notice: Subject to any disclaimer, the term of this patent is extended or adjusted under 35 U.S.C. 154(b) by 452 days.

(21) Appl. No.: 11/766,669

(22) Filed: Jun. 21, 2007

(65) Prior Publication Data

US 2008/0005101 A1 Jan. 3, 2008

Related U.S. Application Data

(60) Provisional application No. 60/815,467, filed on Jun. 22, 2006.

(51) Int. Cl.
*G06F 7/00* (2006.01)
*G06F 17/30* (2006.01)
*G06F 17/00* (2006.01)

(52) U.S. Cl.
USPC .......................... 707/730; 707/741; 707/752

(58) Field of Classification Search
USPC ............ 707/1–5, 10, 100, 722, 723, 727, 730
See application file for complete search history.

(56) References Cited

U.S. PATENT DOCUMENTS

| | | | |
|---|---|---|---|
| 2001/0044720 A1* | 11/2001 | Lee et al. ...................... | 704/251 |
| 2002/0023072 A1* | 2/2002 | Stern et al. ........................ | 707/1 |
| 2002/0049738 A1* | 4/2002 | Epstein ............................. | 707/1 |
| 2002/0065802 A1* | 5/2002 | Uchiyama ........................ | 707/1 |
| 2002/0107735 A1* | 8/2002 | Henkin et al. .................. | 705/14 |
| 2002/0129375 A1* | 9/2002 | Kim et al. ..................... | 725/100 |
| 2003/0025731 A1* | 2/2003 | Chastain et al. ............. | 345/764 |
| 2003/0050927 A1* | 3/2003 | Hussam ............................ | 707/5 |
| 2003/0187886 A1* | 10/2003 | Hull et al. ..................... | 707/203 |
| 2004/0205065 A1* | 10/2004 | Petras et al. ..................... | 707/5 |
| 2005/0160167 A1* | 7/2005 | Cheng et al. .................. | 709/224 |
| 2005/0223002 A1* | 10/2005 | Agarwal et al. .................. | 707/7 |
| 2005/0256866 A1* | 11/2005 | Lu et al. ........................... | 707/5 |
| 2006/0004734 A1* | 1/2006 | Malkin et al. .................... | 707/4 |
| 2006/0036565 A1* | 2/2006 | Bruecken ......................... | 707/1 |
| 2006/0048046 A1* | 3/2006 | Joshi et al. .................... | 715/512 |
| 2006/0136451 A1* | 6/2006 | Denissov ...................... | 707/101 |
| 2006/0282336 A1* | 12/2006 | Huang ............................ | 705/26 |
| 2006/0287971 A1* | 12/2006 | Armstrong ....................... | 707/1 |

(Continued)

OTHER PUBLICATIONS

Ovsiannikov, I.A., Arbib, M.A., and Mcneill, T.H., Annotation Technology. International Journal of Human-Computer Studies, 1999. 50(4): p. 329-362.*

(Continued)

*Primary Examiner* — Kannan Shanmugasundaram

(57) ABSTRACT

A method for determining the significance of a web page, or a portion thereof, is disclosed. Accordingly, a search engine or some other application analyzes user-generated highlights (as well as user-provided comments associated with the highlights) of a document to determine a document relevance score (e.g., Highlight Rank) for the document containing the user-generated highlights. The particular algorithm for determining the document relevance score will vary depending upon the particular implementation, but may generally be based upon an analysis of the number and quality of user-generated highlights and associated comments within a document. Based on this analysis, the search engine assigns the document a document relevance score, which is used for processing the document in accordance with instructions associated with a search query. For example, the document relevance score may be used in selecting and ordering documents returned in search results for a particular search query.

13 Claims, 6 Drawing Sheets

(56) References Cited

U.S. PATENT DOCUMENTS

2007/0143345 A1* 6/2007 Jones et al. ............... 707/104.1
2007/0239713 A1* 10/2007 Leblang et al. ................ 707/6
2007/0276829 A1* 11/2007 Wang et al. ..................... 707/7

OTHER PUBLICATIONS

L. Denoue and L. Vignollet. An annotation tool for Web browsers and its applications to information retrieval. In In Proceedings of RIAO2000, Paris, Apr. 2000.*

* cited by examiner

Stocks tumble amid concerns over technology

Dow records biggest one-day drop since Nov. 27; economic worry weighs

NEW YORK - Wall Street tumbled Monday, as growing concerns over technology companies led jittery investors to pull money out of the market ahead of this week's earnings reports.

The market has been vulnerable to erratic trading lately, with investors cautious about the direction of the economy and companies' results. The tech sector so far has been knocked down the most, after Apple Inc.'s and Intel Corp.'s outlooks last week fell below the Street's expectations.

With industry leaders like Qualcomm Inc. and Microsoft Corp. releasing their financial results later this week, many investors are bracing for disappointment.

"The market is nervous," said Joe Ranieri, managing director in equity trading at Canaccord Adams. "We've had a few good quarters in a row in tech land. The problem with having good quarters is, it gets harder and harder to impress."

Blue chip stocks were also dragged down by a Wachovia analyst's downgrade of Boeing Co.; the analyst cited possible aircraft order delays from the jet maker.

Overall, earnings reports and economic data this year have signaled growth that's cooling, but not

METHOD AND APPARATUS FOR DETERMINING THE SIGNIFICANCE AND RELEVANCE OF A WEB PAGE, OR A PORTION THEREOF

RELATED APPLICATIONS

The present application claims the benefit of the filing date of the U.S. Provisional Patent Application with Ser. No. 60/815,467, filed on Jun. 22, 2006, the contents of which is incorporated herewith.

FIELD

The present invention relates generally to computer network-based information retrieval techniques. More particularly, the present invention relates to methods and systems for searching for and ranking, rating or otherwise indicating the significance of a web page, or a portion thereof.

BACKGROUND

A variety of attempts have been made at organizing the vast amount of material (e.g., internet documents or web pages) available on the Internet in general, and the World Wide Web in particular. Many attempts at organizing internet documents are directed at making it easier to perform searches and for identifying the most relevant material. Although certain techniques for organizing internet documents have proven more successful than others, each method suffers from one or more flaws.

One approach to the problem involves organizing internet documents into a predetermined hierarchy to form a directory of content. Under this approach, a directory or hierarchical structure is created that includes several categories and perhaps several sub-categories based on subject matter. Next, one or more persons individually analyzes each internet document and assigns the document to one or more categories.

This general approach suffers from numerous problems. First, because this approach does not depend on automated analysis, the vast amount of material that requires analysis makes this approach expensive (in terms of man-hours) to implement. That is, employees of the enterprise providing the search service must spend significant amounts of time, at the employer's expense, analyzing and categorizing web pages. Furthermore, because the analysis is dependent upon human reasoning and the number of persons needed to perform the analysis is significant, there is a significant likelihood that inconsistencies will exist. For instance the interpretation by different persons analyzing the content is likely to differ, thereby resulting in inconsistent organization of the content. Moreover, as web authoring tools have improved, web-based content has become much more dynamic. Consequently, content must be frequently revisited and re-analyzed in order to maintain accurate categorization.

A second approach to the problem involves automating the task of organizing content by using software agents (referred to as bots) to analyze content (including metadata associated with each document.) Under this approach, a software agent referred to as a bot or web-crawler automatically performs an analysis of a large number of interact documents, and creates an index based on the analysis. The index is then used by a search engine to perform a "look-up" of those documents that include key words or phrases specified in a search query. The search results will generally be ordered or ranked based on document relevance, for example, measured as the number of times a key word is included in a document.

One problem with this approach is that content authors can easily manipulate search results by including metadata in an internet document. For instance, if enterprise A is a competitor of enterprise B, enterprise A can include as metadata the name of enterprise B in its internet documents. This will raise the level of significance of enterprise A's internet documents for searches that include as a keyword the name of enterprise B. For example, if a user performs a search for the name of enterprise B, an internet document of enterprise A is likely to be included in the search results, and possibly listed higher in order than an internet document for enterprise B. This ability to manipulate search results makes this method problematic.

In yet another approach to the problem, metadata manipulation is overcome by determining an internet document's relevance based on an analysis of incoming links directed to a particular internet document. For example, if the analysis of a large number of internet documents indicates that a particular internet document is the most frequently linked to document in the group, then there is an assumption that the internet document is the most relevant. Moreover, the weight given to each incoming link to a document might vary in accordance with the relevance of the document containing the link. That is, if a document that is deemed highly relevant includes a link to another document, that link may be given greater weight because of the high relevance of the document containing the link. This type of analysis is explained in greater detail in U.S. Pat. No. 6,285,999, entitled, "Method for Node Ranking in a Linked Database."

One of the primary problems with this approach is that an internet document's relevance is determined not by the end-users (e.g., the readers) of the internet document, but by the authors of other internet documents. Consequently, only content authors have a "vote" in determining a document's relevance. Many users (e.g., readers) of Internet content either have no desire to be publishers of content, or do not have the technical savvy to publish content. In any case, these users are not provided a voice in determining the relevance of Internet content. Consequently, a better method of determining content relevance is desirable.

SUMMARY

A method for determining the significance of a web page, or a portion thereof, is disclosed. Accordingly, a search engine or some other application analyzes user-generated highlights (as well as user-provided comments associated with the highlights) of a document to determine a document relevance score (e.g., Highlight Rank) for the document containing the user-generated highlights. The particular algorithm for determining the document relevance score will vary depending upon the particular implementation, but may generally be based upon an analysis of the number and quality of user-generated highlights and associated comments within a document. Based on this analysis, the search engine assigns the document a document relevance score, which is used for processing the document in accordance with instructions associated with a search query. For example, the document relevance score may be used in selecting and ordering documents returned in search results for a particular search query.

In another aspect of the invention, search results to a search query are provided. In one embodiment of the invention, a search engine provides a user with the ability to search for documents containing search terms that have been highlighted. Moreover, various search parameters enable the user to fine tune the search. In another embodiment, a search engine provides search results to a search query, based in part on an analysis of user-generated highlights associated with documents that otherwise satisfy various user-specified search parameters. Other aspects of the invention are described in greater detail below.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings, FIG. 1 illustrates an example of an internet document, or web page, with user-generated highlights, according to an embodiment of the invention;

FIG. 3 illustrates an example of a web page providing an advanced search interface, according to an embodiment of the invention;

DETAILED DESCRIPTION

Figure 2:
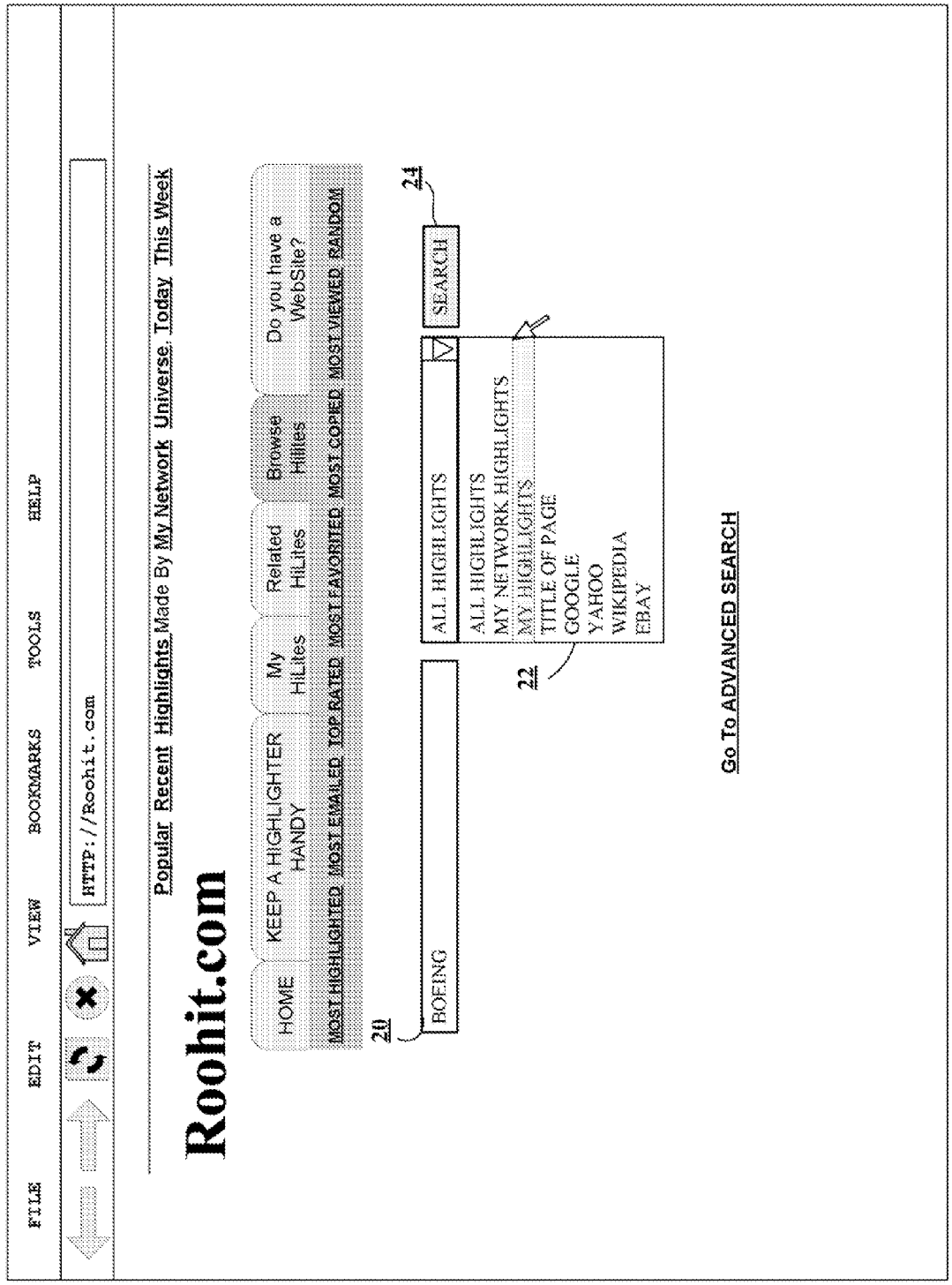
FIG. 2 illustrates an example of a web page providing a search interface, according to an embodiment of the invention.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Consistent with one embodiment of the invention, a search engine receives a search query specifying one or more keywords or search terms. The search engine processes the search query by identifying internet documents that satisfy the search query. For example, the search engine may process the search query by identifying those documents that include one or more of the search terms. In addition, the search engine orders the internet documents that satisfy the search query based in part on a document relevance score assigned to each internet document, where the document relevance score (referred to herein as a Highlight Rank) is based on an analysis of user-generated highlights associated with the internet documents.

In various embodiments of the invention, the particular analysis of the user-generated highlights, which is used to rank or rate document relevance in a search, may vary. For example, in one embodiment of the invention, the document relevance score is assigned to each document based on how many times the internet document has been highlighted. In another embodiment of the invention, the document relevance score is assigned based on the number of unique users who have made a highlight in the internet document. In yet another embodiment of the invention, the document relevance score is determined in connection with a particular keyword or words appearing in the internet document. For instance, the document relevance score may be based on the number of times a particular keyword or words have been highlighted in the document.

In yet another aspect of the invention, data associated with highlights may be used as a search parameter, and/or to rate or rank the relevance of a document, or a portion thereof. For example, in one embodiment of the invention, the highlighting service which enables the creation of highlights may also allow users to associate comments with the highlights. Accordingly, a search may be performed to locate a particular search term within a comment that is a associated with a highlight. Similarly, the number of comments associated with a highlight, particularly a certain word that has been highlighted, may be an indication of the document's relevance with respect to search terms that include the highlighted word. Accordingly, a document with a highlight that has many comments may, in one embodiment of the invention, be assigned a higher document relevance score.

In yet another aspect of the invention, searchers may specify the source of a highlight or a comment associated with a highlight as a search parameter for a search query. For example, a searcher may be interested only in documents that have been highlighted by, or include comments from, a particular source—such as a particular user or person, a person within the searcher's social network, and/or a member of a particular group.

In various embodiments of the invention, other attributes and characteristics of a highlighting service may be used as search parameters in a search query, or as data for weighting, ranking or rating a document's relevance. For instance, a highlighting service may enable users to rate or rank other user's highlights or comments. The rating or ranking may be as simple as selecting a number on a scale, such as one to five, or one stars through five stars. Alternatively, a highlight or comment may be marked as a favorite by a user. Accordingly, a searcher may specify as a search parameter a particular ranking or rating associated with a highlight or comment. For example, a searcher may perform a search only for documents containing highlights that have an aggregate user rating equal to or above some threshold rating. Similarly, the ranking or rating information may be aggregated such that all user rankings or ratings associated with a document, highlight, or comment may be used to determine the relevance of a particular object (e.g., the document, highlight or comment). Other aspects of the invention are described in detail below.

FIG. 1 illustrates an example of an Internet document with user-generated highlights, according to an embodiment of the invention. As illustrated in FIG. 1, two user-generated highlights (e.g., highlights 10 and 12) have been made within the internet document. Those highlights include the two text strings: "later this week, many investors are bracing for disappointment," and "downgrade of Boeing Co.". A method and system for generating such highlights are described in U.S. patent application Ser. No. 11/766,786, entitled, "Method and Apparatus for Highlighting a portion of an Internet Document for Subsequent Retrieval and/or Sharing". Although FIG. 1 provides an example of highlighted text, in one embodiment of the invention, other objects shown in an internet document or web page may be highlighted as well. An internet document may be a publicly available document, or a document from an intranet.

Referring again to FIG. 1, in accordance with an embodiment of the invention, a user can perform a search to locate internet documents, or web pages, which include search terms in highlighted portions of the document. Accordingly, if user A is responsible for the highlighted portions of the web page illustrated in FIG. 1, the highlights made by user A are available to be searched by any user. For example, user B may perform a search for all documents that contain the search term "BOEING" in a highlighted portion of the document. In this case, a link to the web page illustrated in FIG. 1 would be provided as a search result to user B's search.

In another aspect of the invention, highlights are analyzed in the aggregate. That is, highlights made by all users of a highlighting service may be analyzed in the aggregate to determine a document's relevance. For example, if numerous user's highlight the same word, phrase or passage in a particular document, the document may be particularly relevant with respect to searches having search terms found in the highlighted portion of the document. Consequently, tallying the total number of times a particular word or words are highlighted in a particular document can be used to provide a measure of that document's relevance with respect to that key word or words. By using information mined from user-generated highlights, search engine accuracy can be improved.

FIG. 2 illustrates an example of an internet document, or web page, providing a search interface, according to an embodiment of the invention. As illustrated in FIG. 2, the search interface is associated with a highlighting service web portal. Accordingly, in one embodiment of the invention, a search engine or search service may be tightly integrated with a highlighting service, such that each service operates within the same domain if not on the same server. However, in an alternative embodiment of the invention, the search algorithms and methods described herein may be implemented in any number of search engines including a general search engine, or an enterprise search engine configured specifically for a particular topic or subject matter. Moreover, in one embodiment of the invention, a general or enterprise search engine may query a highlighting service for select data used in assessing document relevance. For instance, a search engine may use an application programming interface to query a highlighting service for data generated by and stored at the highlighting service. Such data may be used to enhance and/or improve search engines operated by other enterprises.

In general, a user (e.g., a searcher) performs a search by specifying one or more search terms and/or parameters. Referring again to FIG. 2, for example, a searcher may perform a search by inputting search terms in text input box 20 and selecting the "SEARCH" button 24. In addition, the searcher may specify other search parameters. For example, as illustrated in FIG. 2, in drop down box 22 a searcher can specify a location in which to search for the particular user-specified search terms. In one embodiment of the invention, a search can be performed to locate documents that include the search terms within a highlighted portion of the document. For instance, by specifying in drop down box 22 to run the search for "ALL HIGHLIGHTS" a user can find all documents that include the search term "BOEING" within a highlighted portion of the document.

Alternatively, a user may wish to narrow the search by specifying that the search term be located within highlights that were made only by members of the searcher's network. In various embodiments of the invention, different mechanisms may be used to build out and determine who is in a particular searcher's network. In any case, by specifying something like "MY NETWORK HIGHLIGHTS" in drop down box 22, a user can search for documents which contain the search term in a highlight made by a member of the searcher's network.

In addition, a searcher may specify that the search is to be executed only against the searcher's own highlights. For example, by specifying "MY HIGHLIGHTS" in the drop down box in FIG. 2, the searcher can search for documents that include the search term "BOEING" in a portion of a document previously highlighted by the searcher.

The drop down box 22 in the search page of FIG. 2 provides a variety of other examples of search parameters that may be specified by a searcher, according to an embodiment of the invention. For example, a searcher may specify that the search term is to be located within the title of a highlighted page (e.g., by specifying "TITLE OF PAGE"). In yet another example, the searcher may specify what domain a target document with a highlight should be located within. For instance, a user may specify that the search term be found in a highlighted portion of a document that is hosted at a particular domain, such as Wikipedia, or eBay. In various embodiments of the invention, the drop down box 22 illustrated in FIG. 2 may be customized with any number of other search parameters. Furthermore, those skilled in the art will appreciate that the search parameters illustrated in FIG. 2 may be implemented with a wide variety of alternative user interface objects consistent with the invention, and that the drop down box 22 illustrated in FIG. 2 is simply one example.

Figure 3:
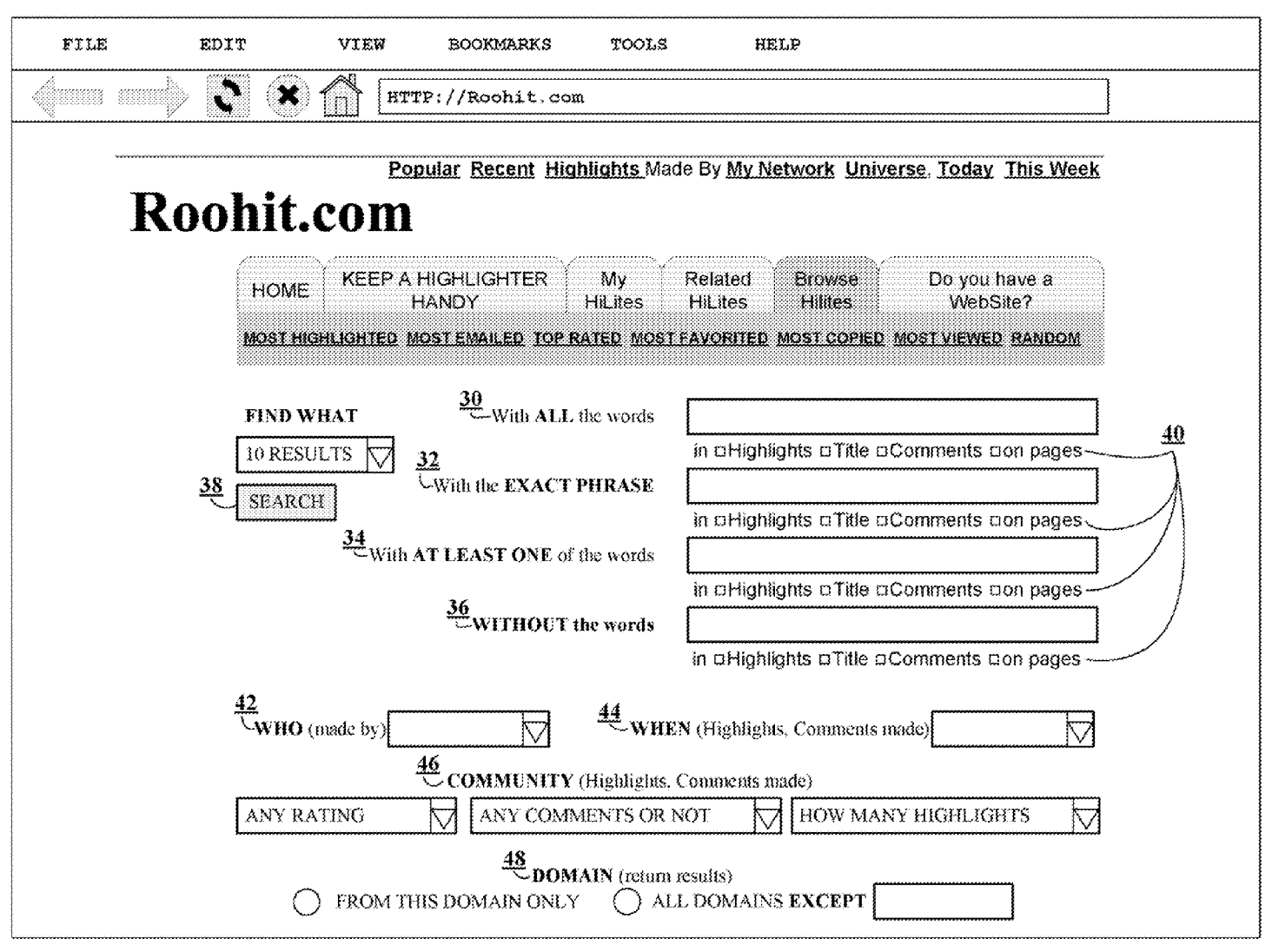

In one embodiment of the invention, a great number of other search parameters may be specified for an advanced search. FIG. 3 illustrates an example of an internet document, or web page, providing an advanced search interface, according to an embodiment of the invention. As illustrated in FIG. 3, several text input boxes are provided (e.g., text input boxes associated with reference numbers 30, 32, 34 and 36), thereby enabling a searcher to select a particular type of search. For example, by entering search terms in the text box with reference 30, a search can specify that all of the search terms are required to be found in the target objects. Similarly, by entering search terms at text box 32, the searcher can specify an exact phrase as a search term. By using text boxes 34 and/or 36, a searcher can specify that the target object include at least one search term, or none of the search terms. In this case, the type of the target object is set by checking one or more of the target location boxes 40 associated with each text entry box (e.g., 30, 32, 34 and/or 36). For instance, a searcher can perform a search for internet documents that include certain user-specified search terms within such targets as 1) a highlighted portion of the internet document, 2) a title of an internet document, 3) a comment associated with a highlighted portion of an internet document, and/or 4) a web page or internet document. For instance, by entering a search term (e.g., BOEING) in the text entry box associated with reference 30, and checking the box for "on pages", a searcher can perform a search for all documents that include the term "BOEING" in the text of the document. After entering the appropriate search terms, and selecting the target requirements, a searcher simply selects the search button 38 to perform the search.

As illustrated in FIG. 3, other search parameters may be specified as well. For example, the drop down box with reference number 42 enables a user to select a source for the target object. That is, if a searcher is performing a search to find a particular search term within a highlight, then the searcher can specify that the search is to return only those highlights that include the search term and that were made by a particular user, a user from a particular group, or a person within the searcher's network, etc. Similarly, drop down box 44 enables a user to specify when a particular target object (e.g, highlight, comment, etc.) was made. For example, a searcher can specify that only highlights or comments made on or before a particular date, or after a particular date, be returned in the search results.

The drop down boxes associated with reference number 46 enable a searcher to specify a rating associated with a target object. For example, in one embodiment of the invention, users can rate highlights and/or comments. Accordingly, a searcher may be interested in only finding highlights or comments that have an aggregate or overall rating that exceeds some predetermined user-specified level. Similarly, a searcher may specify whether the target object is to have any associated comments or not. For example, a searcher may be interested in only those highlights that have received user comments. A searcher may also specify a particular number of highlights to be included in a target document. For example, the searcher may only want to view internet documents that have been highlighted a certain number of times. Finally, with the radio buttons associated with reference number 48, a searcher may set a search parameter controlling the domains that are searched. For instance, another search parameter that may be controlled via the advanced search interface is the domain associated with the target object. A searcher may specify that the search only return documents from a particular domain, or from all domains except a particular domain.

Figure 4:
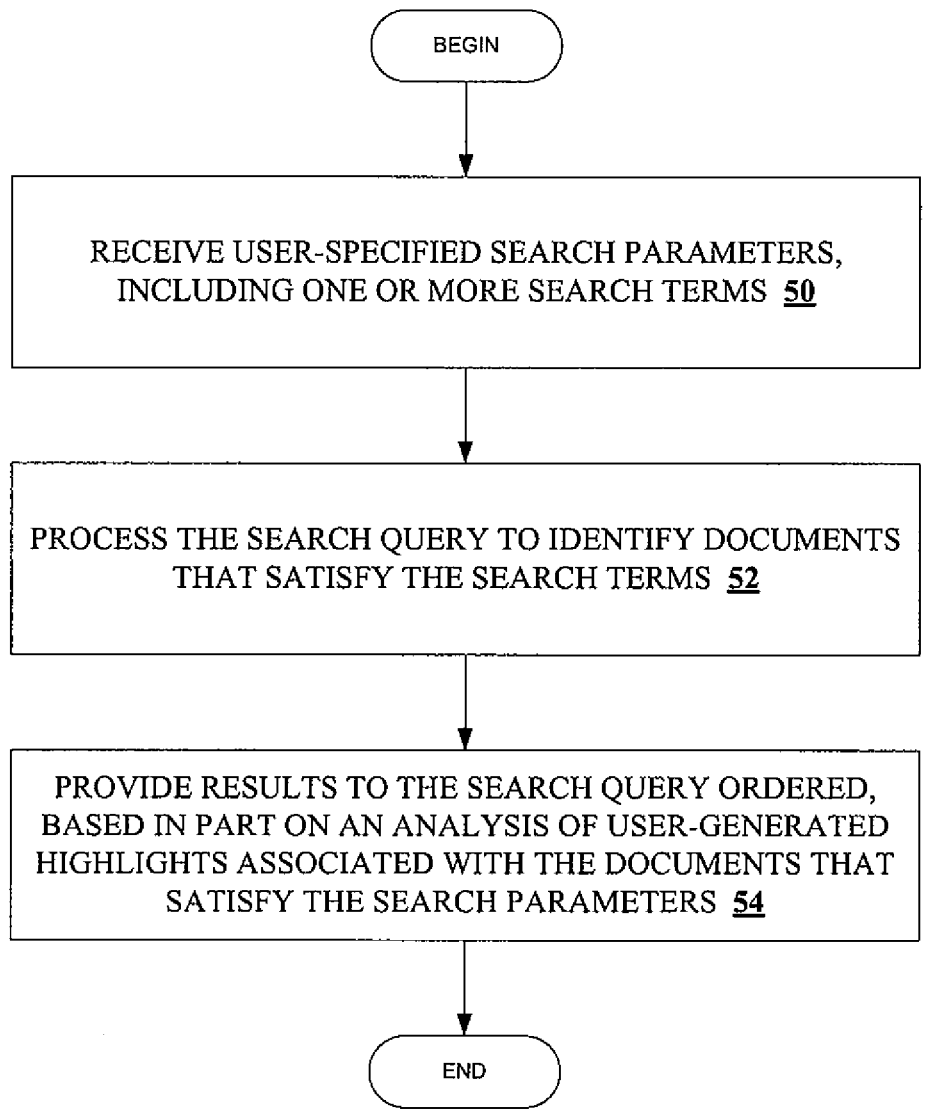
FIGS. 4 and 5 illustrate methods, according to embodiments of the invention, for ordering internet documents to be listed in the search results of a search query; and, FIG. 6 illustrates a method, according to an embodiment of the invention, for assigning a document relevance score (e.g., highlight rank) to one or more documents, based on an analysis of user-generated highlights on the one or more documents.

FIG. 4 illustrates a method, according to an embodiment of the invention, for providing search results to a search query. At method operation 50 a search engine receives user-specified search parameters for a search query. For example, the search parameters may include any of those described above in connection with FIGS. 2 and 3, to include (but not be limited to): search terms (e.g, keyword(s)), domain associated with a document, source of a highlight or comment included in a document, user-rating of a highlight in a document, and so on. At method operation 52, the search engine processes the search query to identify those documents that satisfy the search parameters. Finally, at method operation 54, the search engine provides the search results in an order based in part on an analysis of user-generated highlights associated with the documents that satisfy the search parameters.

According to the method illustrated in FIG. 4, the set of internet documents to be searched may include both documents with and without user-generated highlights. In one embodiment of the invention, method operation 54 orders the documents satisfying the search parameters such that the documents that have highlights are listed prior to any documents that have not been highlighted. Alternatively, in one embodiment, only the documents that have highlights are listed in search results. For example, by default, a document must have been highlighted to be included in a list of search results, thereby reducing the overall number of documents that are listed in any given set of search results.

Figure 5:
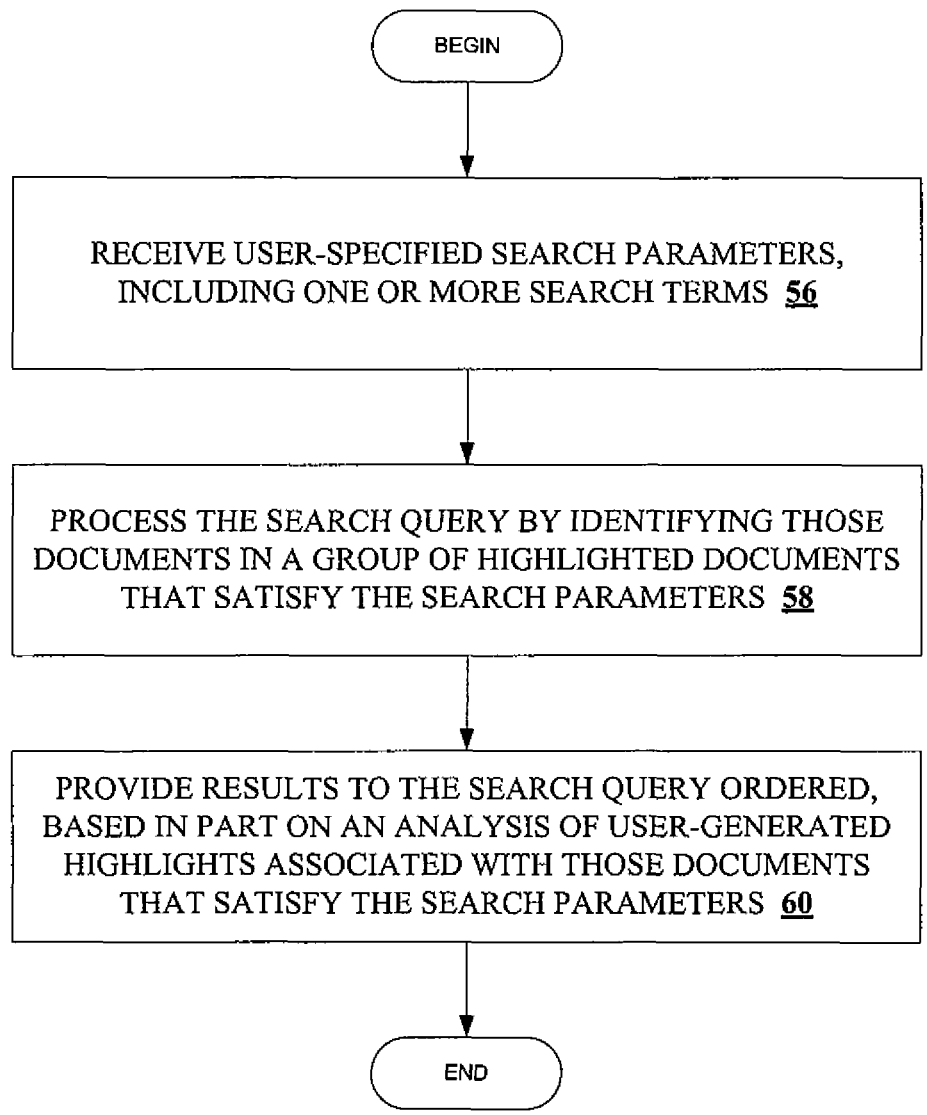

In an alterative embodiment of the invention, the search engine may target only those documents that have user-generated highlights. For example, as illustrated in FIG. 5, one method for providing search results to a search query begins at step 56 when a search engine receives user-specified search parameters including one or more search terms. At step 58, the search query is processed by identifying those documents from a group of previously highlighted documents that otherwise satisfy the search parameters. For example, the universe of documents to be searched is limited to those documents that a user has already highlighted. Finally, at step 60, the results of the search query are provided in an order that is based, in part, on an analysis of the user-generated highlights.

Figure 6:
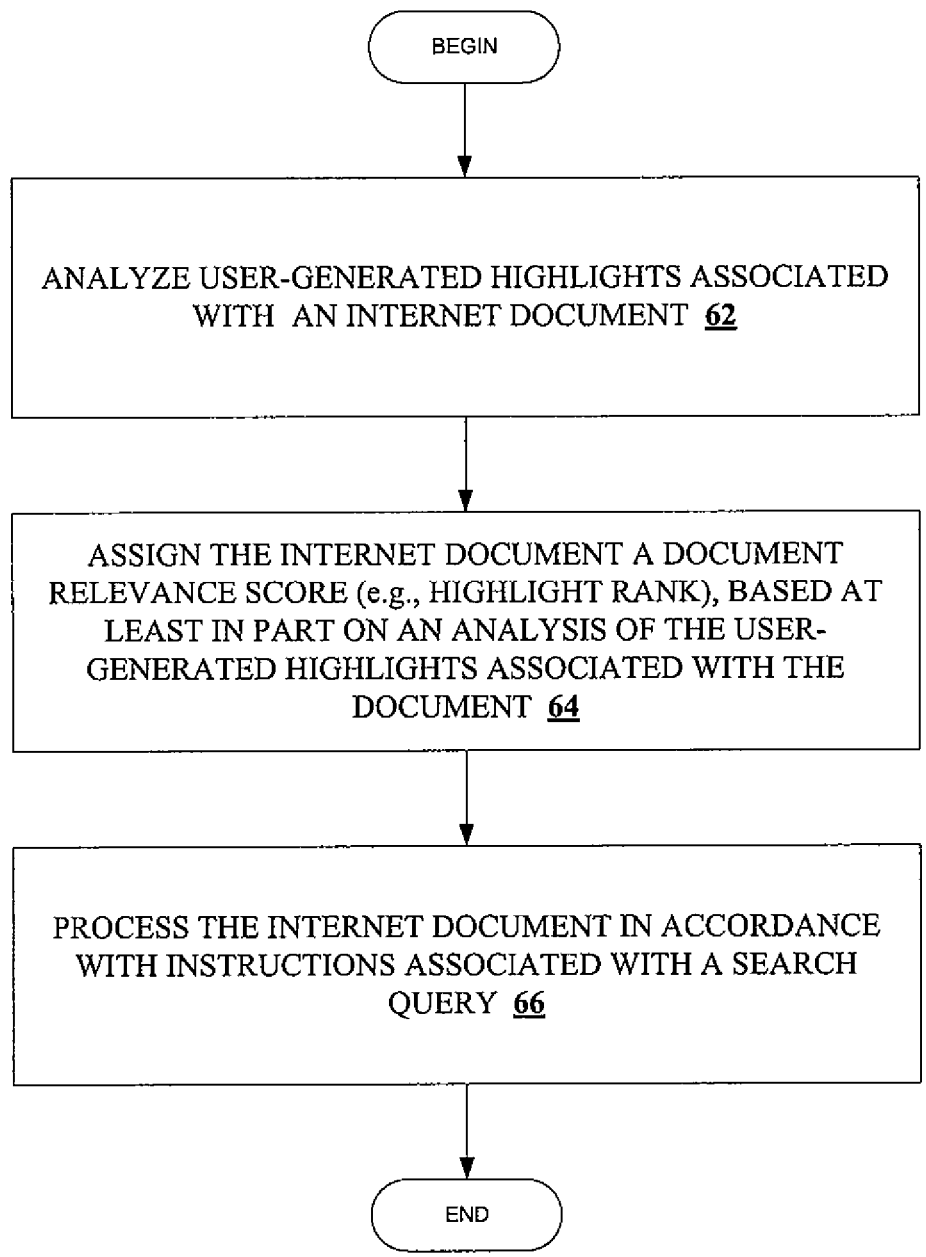

FIG. 6 illustrates a method, according to an embodiment of the invention, for assigning a document relevance score (e.g., Highlight Rank) to an internet document based on an analysis of user-generated highlights associated with the document. At method operation 62, the user-generated highlights associated with an internet document are analyzed in accordance with a document relevance algorithm. A variety of algorithms may be used. For example, the number of highlights associated with each individual document may be tallied. The number of comments associated with each highlight of the document may be tallied. Alternatively, the highlighted text on each document may be analyzed such that a count indicating how frequently each word or term on a particular document has been highlighted is performed. The number of unique users who have generated a highlight on the document may be calculated.

At method operation 64, a document relevance score (e.g., Highlight Rank), which is determined at method operation 62, is assigned to the document. The document relevance score may be based directly on any one of the measures described above (e.g., number of highlights, number of comments, etc.), or some combination of such measures. For instance, one or more of the above described measures may be weighted, and then combined in some manner to arrive at an overall document relevance score, referred to as a Highlight Rank. Finally, at method operation 66, the document is processed in accordance with instructions associated with a search query. For example, the document may be positioned in the search results of a search query based in part on its document relevance score or Highlight Rank, prior to being returned or displayed to a searcher.

Consistent with an embodiment of the invention, the level of significance of an object or document is determined based on an analysis of user-generated highlights, or data associated with user-generated highlights. For example, in one embodiment of the invention, the level of significance of an internet document may be determined in part on the total number of user-generated highlights associated with a particular internet document. In this case, the document relevance score (representing the level of significance) is independent of any search terms, and can be calculated and assigned prior to a search being performed. For example, a tally of user-generated highlights can be kept on an on-going basis. Then, when a search is performed, those documents that satisfy the search can be presented in an order that is based on the predetermined document relevance score of each document.

In another embodiment of the invention, the level of significance of each internet document may be determined based on the number of search terms that appear within a highlighted portion of a document. For instance, internet documents that have been highlighted by a user may be analyzed to determine a count of the number of times each word in the document has been highlighted. Accordingly, as the documents that satisfy a search query are identified, the count of the times that each search term has been highlighted can be used to determine document relevance. Accordingly, the document relevance can be used to order the documents as they are listed or otherwise provided in search results.

In one embodiment of the invention, in addition to analyzing user-generated highlights, document relevance scores are determined based on a wide variety of user-initiated activities associated with documents. For example, the score assigned to a particular document might be based (in whole or in part) on: the number of comments associated with the document, the number of user-ratings associated with a document, an average user-rating associated with the document, the number of relevance flags associated with the document, the number of times the document has been viewed, the number of times the document has been emailed, the number of times the document has been marked as a user favorite, and/or the number of times the document has been copied. Similarly, the document relevance score may be based on one or more of the following: the number of users who have generated highlights on the document; the number of users who have provided comments on the document, or a highlight associated with the document; the number of users who have provided a rating for the document, a highlight associated with the document, or a comment on the document; the number of users who have flagged relevance; the number of users who have viewed the document; the number of users who have emailed the document; the number of viewers who have marked the document as a favorite; and/or the number of users who have copied the document.

In one embodiment of the invention, one or more of the components that comprise the document relevance score may be weighted according to a weighting factor. For instance, in one embodiment of the invention, a user of the highlighting service may be assigned a user rating or score, based (in whole or in part) on how other users rank or rate the user, or past highlights or comments made by the user. Accordingly, a highlight or comment made by a user who has a high user rating will carry more weight in determining the document relevance score. For example, a document with several highlights made by users with high ratings will have a greater document relevance score than a similar document with highlights made by users who have low user ratings. In addition, a user's level of activity may play a part in determining his or her user rating, and therefore affect the weight of any highlights or comments made by that user in determining a document relevance score. For instance, in one embodiment, active users who make a relatively large number of comments or highlights may have higher (or lower) user ratings, thereby increasing (or decreasing) the user weighting factor for highlights or comments made by those users. In yet another embodiment of the invention, a highlight or comment may be weighted based on how many people have subscribed to receive highlights from the person who made the highlight or comments. For instance, in one embodiment of the invention, users can subscribe to receive other user's highlights. Accordingly, a user who has been highly subscribed to (e.g., many other users have subscribed to receive the user's highlights) will generally have a greater user rating, and thus, highlights or comments made by that user will carry greater weight in determining a document relevance score. A user's rating may change over time, for example, as other users continually provide new ratings for the user and his or her highlights and/or comments. Furthermore, a user's rating may be different with respect to different subjects and/or objects. For instance, a user may have a rating that is dependent upon, or based upon, highlights the user has made to documents in a given domain. Accordingly, the user may have a rating for that domain that is different than his or her rating for other domains. Similarly, a user may have one rating for comments, and another rating for highlights.

In one embodiment of the invention, the document relevance score may be normalized, and then presented with the search results associated with a search query. For example, the document relevance score may be normalized to a number between one and ten, and then displayed along with the document to which it is associated. Similarly, a graphical icon or image may be presented to indicate a summary of the document relevance score. For example, the graphic may be a number of stars, where more stars represent a greater document relevance of higher Highlight Rank. Similarly, the graphic may be a number of highlighter markers, where the number of highlighter markers indicates the overall relevance of the document, based on the analysis of the highlights associated with the document.

In yet another embodiment of the invention, multiple document relevance scores may be determined and displayed. For instance, one graphic or icon may represent a document's relevance as measured under one algorithm, while a second graphic represents the document's relevance as measured under another algorithm. For example, separate graphics or icons may be used to display information about the highlights and comments in the associated documents. One icon may represent the number of comments, while the other icon represents the number of highlights. Other variations will be apparent to those skilled in the art.

In one embodiment of the invention, the search engine may be tightly integrated with the highlighting service that is used to manage the highlights associated with the internet documents. Accordingly, in one embodiment the universe of searchable documents may be only those documents that have been highlighted by a user of the highlighting service. In another embodiment of the invention, the search engine may be operated on a server that is remote from the highlighting server providing the highlighting service. In this case, the highlighting service may be consulted only for purposes of ranking or ordering documents that the search engine has identified as satisfying the search query. Accordingly, the search engine may simply communicate messages (e.g., via an applications programming interface, or API) with the highlighting service to obtain document relevance scores based in part on an analysis of user-generated highlights performed by the highlighting service.

Consistent with an embodiment of the invention, and in contrast to prior art methods for assessing document relevance, the relevance of a document is determined by a potentially large group of users of the document. For example, by highlighting a document, a user is implicitly casting a vote for the document. Accordingly, rather than determine document relevance based on the number of incoming links to a document (which are controlled solely by the authors of documents), document relevance is determined based on user-generated highlights which can easily be generated by users of a highlighting service.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

What is claimed is:

1. A method, comprising:
a search engine receiving a user-specified search query, said search query specifying one or more search terms;
the search engine processing the search query by identifying a set of documents that satisfy the search query;
the search engine providing the set of documents that satisfy the search query, ordered, at least in part, according to a document relevance score that is based on an analysis of past user-generated highlights,
wherein a user-generated highlight comprises a visual modification of a user selected portion of a web-enabled document by a highlighting application, wherein the user manually controls the highlighting application to visually indicate the user selected portion, and wherein information about the past user-generated highlights has been stored in a repository, and wherein the document relevance score of a document is determined by a plurality of weighted factors comprising: a number of past highlights made on the document, a number of users that made highlights on the document, a number of comments made on the document, a number of times the document has been shared, a number of times the document has been viewed, a past rating of the document, a content of the document, a content of a past highlight, a content of a specific sections of the document, a relevance of the users that contributed an activity associated with the document, a set of ratings of contributing users, a point in time when the activities were performed, and a source of the document.

2. The method of claim 1, wherein each user-generated highlight is created using a pointer on a screen.

3. The method of claim 1, wherein each user-generated highlight changes the color around the use selected text in the document having the user-selected text.

4. The method of claim 1, wherein the user-selected text includes a non-hyperlinked text.

5. The method of claim 1, wherein the document relevance score is based at least in part on a number of unique users who made a highlight in the document.

6. The method of claim 1, wherein the document relevance score is based at least in part on number of comments associated with a highlight in the document.

7. The method of claim 1, wherein the document relevance score is based at least in part on a number of relevance flags associated with the document.

8. The method of claim 1, wherein the document relevance score is based at least in parson a number of times the document has been emailed.

9. The method claim 1, wherein the document relevance score is based at least in part on a number of times the document has been copied.

10. The method of claim 1, wherein the document relevance score is based at least in part on a weighting factor applied to each user-generated highlight.

11. The method of claim 10, wherein the weighting factor is based at least in part rating of the user that created each user-generated highlight.

12. The method of claim 11, herein the rating of the user is ter mined at least in part on the number of highlights made by the user.

13. The method of claim 11, wherein the rating of the user is determined at least in part on a user-rating given to the user by other people.

* * * * *